J. PRIEST.
Dumping Wagon.
No. 74,131.  Patented Feb. 4, 1868.
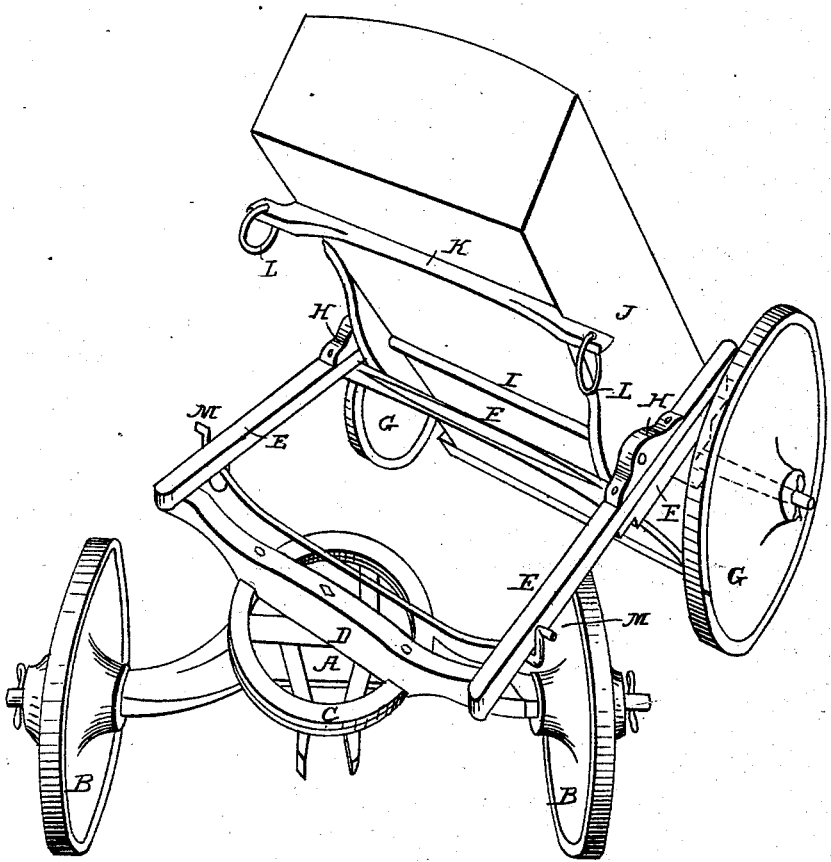

United States Patent Office.

JORAM PRIEST, OF DETROIT, MICHIGAN.

*Letters Patent No. 74,131, dated February 4, 1868.*

IMPROVEMENT IN DUMPING-WAGON.

*The Schedule referred to in these Letters Patent and making part of the same.*

TO ALL WHOM IT MAY CONCERN:

Be it known that I, JORAM PRIEST, of Detroit, in the county of Wayne, and State of Michigan, have invented a new and useful Improvement in Dumping-Wagons; and I do declare that the following is a true and accurate description thereof, reference being had to the accompanying drawings, and to the letters of reference marked thereon, and being a part of this specification.

This invention consists in so constructing a wagon that the box may be readily and easily emptied of its contents, by dumping or tilting to the rear of the wagon.

In order to accomplish this, I construct a wagon, the forward part of which is made in the ordinary method, A being the axle, B the wheels, C the circle, and D the bolster. To the bolster D, I attach longitudinal bars, E, extending toward the rear of the wagon, and their opposite ends being attached to the crank-axle F, upon which are placed the hind wheels G. At a proper point on the longitudinal bars E, I fasten proper bearings, H, for the semi-rotating transverse bar I, to which the box J is secured, and which acts as a fulcrum, upon which the box turns. This transverse bar I should be placed at or near the centre of the length of the box, so that the box will be nearly balanced upon it. K is a transverse bar, fastened near the front end of the box, and extending a little beyond the same, on either side, which forms a bearing to rest upon the longitudinal bars E. L are rings attached to the ends of the transverse bar K, which are slipped over the catch M, to hold the box in a horizontal position when desired. The box may be held, however, in this position, by any other convenient device. In the way above described, I am able to build a wagon for the purposes designated, which will operate readily, by allowing the box to dump or tilt between the hind wheels, upon a fulcrum placed between the front and hind wheels, will cost but little if any more than a wagon of ordinary construction, and will be equally as strong.

What I claim as my invention, and desire to secure by Letters Patent, is—

1. Hanging the box J upon the longitudinal bars E, by a proper fulcrum between the front and hind wheels, so that the box will tilt or dump between the hind wheels.

2. The crank-axle F, when operating for the purposes herein described.

3. The semi-rotating bar I and bearings H, when constructed and operating substantially as and for the purposes set forth.

4. The combination of the above parts with the axle A, the wheels B and G, the circle C, the bolster D, the wagon-box J, the transverse bar K, the rings L, and the catch M, or their equivalents, when constructed and operating as and for the purposes herein set forth.

JORAM PRIEST.

Witnesses:
H. S. SPRAGUE,
H. G. HANNAMAN.